(12) United States Patent
Kato et al.

(10) Patent No.: US 11,868,885 B2
(45) Date of Patent: Jan. 9, 2024

(54) LEARNING DEVICE, INFERENCE DEVICE, LEARNING METHOD, AND INFERENCE METHOD USING A TRANSFORMATION MATRIX GENERATED FROM LEARNING DATA

(71) Applicant: KABUSHIKI KAISHA TOSHIBA, Minato-ku (JP)

(72) Inventors: Yuichi Kato, Kawasaki (JP); Kouta Nakata, Shinagawa (JP); Susumu Naito, Yokohama (JP); Yasunori Taguchi, Kawasaki (JP); Kentaro Takagi, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 811 days.

(21) Appl. No.: 16/999,191

(22) Filed: Aug. 21, 2020

(65) Prior Publication Data
US 2021/0264259 A1    Aug. 26, 2021

(30) Foreign Application Priority Data
Feb. 26, 2020 (JP) .................................. 2020-030794

(51) Int. Cl.
| G06N 3/06 | (2006.01) |
| G06N 3/08 | (2023.01) |
| G06N 5/04 | (2023.01) |
| G06F 17/18 | (2006.01) |
| G06F 17/16 | (2006.01) |
| G06N 3/063 | (2023.01) |

(52) U.S. Cl.
CPC ............... *G06N 3/08* (2013.01); *G06F 17/16* (2013.01); *G06F 17/18* (2013.01); *G06N 3/063* (2013.01); *G06N 5/04* (2013.01)

(58) Field of Classification Search
CPC ............. G06N 3/063; G06N 3/08; G06N 5/04
See application file for complete search history.

(56) References Cited

U.S. PATENT DOCUMENTS

| 2021/0133476 A1* | 5/2021 | Goodman | .............. G06F 18/214 |
| 2021/0256391 A1* | 8/2021 | Karlinsky | .............. G06V 10/82 |

OTHER PUBLICATIONS

Cover, T. M. et al., "Nearest Neighbor Pattern Classification," IEEE Transactions on Information Theory, vol. IT-13, No. 1, Jan. 1967, 7 pages.

* cited by examiner

*Primary Examiner* — Hal Schnee
(74) *Attorney, Agent, or Firm* — Oblon, McClelland, Maier & Neustadt, L.L.P.

(57) ABSTRACT

According to an embodiment, a learning device includes a memory and one or more processors coupled to the memory. The one or more processors are configured to: generate a transformation matrix from learning data in which feature quantities and target values are held in a corresponding manner; and learn about parameters of a neural network which includes nodes equal in number to the number of rows of the transformation matrix, a first output layer representing first estimation distribution according to the values of the nodes, and a second output layer representing second estimation distribution decided according to the product of the transformation matrix and the first estimation distribution.

9 Claims, 6 Drawing Sheets

FIG.6

| SERIAL NUMBER \ VARIABLE | $T_1$ | $T_2$ | $T_3$ | $P_1$ | $P_2$ |
|---|---|---|---|---|---|
| 1 | 100 | 100 | 100 | 10 | 10 |
| 2 | 200 | 100 | 100 | 5 | 10 |
| ... | | | | | |
| N-1 | 100 | 10 | 200 | 0 | 10 |
| N | 0 | 100 | 0 | 10 | 0 |

FIG.7

| SERIAL NUMBER \ VARIABLE | $T_1$ | $T_2$ | $T_3$ | CLASS |
|---|---|---|---|---|
| 1 | 100 | 100 | 100 | 1 |
| 2 | 200 | 100 | 100 | 0 |
| ... | | | | |
| N-1 | 100 | 10 | 200 | 1 |
| N | 0 | 100 | 0 | 0 |

LEARNING DEVICE, INFERENCE DEVICE, LEARNING METHOD, AND INFERENCE METHOD USING A TRANSFORMATION MATRIX GENERATED FROM LEARNING DATA

CROSS-REFERENCE TO RELATED APPLICATIONS

This application is based upon and claims the benefit of priority from Japanese Patent Application No. 2020-030794, filed on Feb. 26, 2020; the entire contents of which are incorporated herein by reference.

FIELD

Embodiments described herein relate generally to a learning device, an inference device, a learning method, and an inference method.

BACKGROUND

The k-nearest neighbors algorithm is a machine learning method in which k pieces of learning data nearest to input data within the defined distance are selected to solve the problems of regression analysis and class separation with respect to the input data. The k-nearest neighbors algorithm has been known from long ago, and is a simple and powerful method frequently implemented even now in the year 2020. In the k-nearest neighbors algorithm, the issue is that the count k of the selected pieces of the data and the weights of the k selected pieces of the data are dependent on the data to be solved.

However, in the conventional technology, the count k of the selected pieces of the data and the weights of the k selected pieces of the data must be decided in a heuristic manner.

BRIEF DESCRIPTION OF THE DRAWINGS

FIG. 6 is a diagram illustrating an example of learning data (in the case of performing regression analysis) according to the embodiment;

FIG. 7 is a diagram illustrating an example of the learning data (in the case of performing class separation) according to a modification example of the embodiment.

DETAILED DESCRIPTION

According to an embodiment, a learning device includes a memory and one or more processors coupled to the memory. The one or more processors are configured to: generate a transformation matrix from learning data in which feature quantities and target values are held in a corresponding manner; and learn about parameters of a neural network which includes: nodes equal in number to number of rows of the transformation matrix; a first output layer representing first estimation distribution according to values of the nodes; and a second output layer representing second estimation distribution decided according to product of the transformation matrix and the first estimation distribution.

An exemplary embodiment of a learning device, an inference device, a learning method, and an inference method is explained below in detail with reference to the accompanying drawings.

Exemplary Functional Configuration of Learning Device

Figure 1:
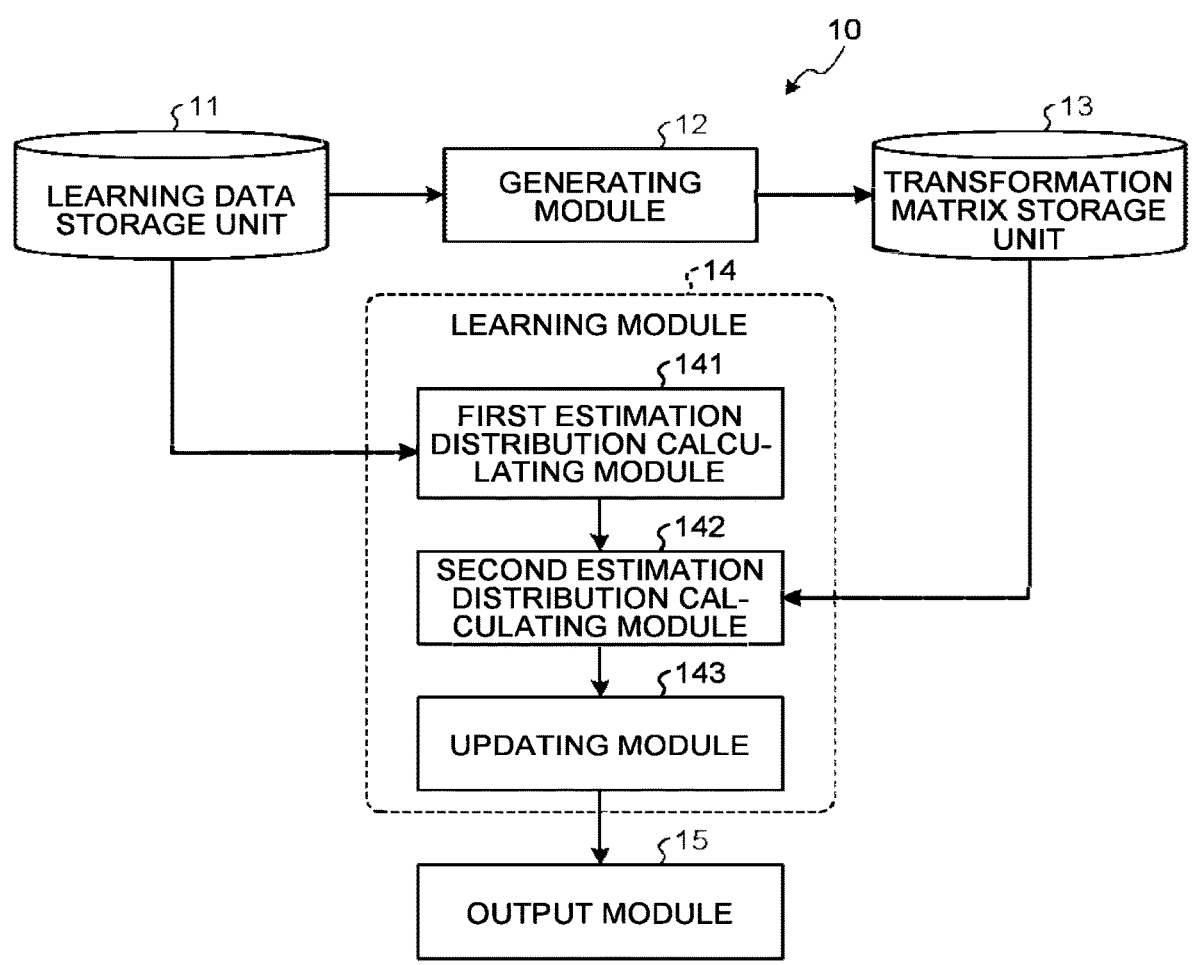
FIG. 1 is a diagram illustrating an exemplary functional configuration of a learning device according to an embodiment.

FIG. 1 is a diagram illustrating an exemplary functional configuration of a learning device 10 according to the embodiment. The learning device 10 according to the embodiment includes a learning data storage unit 11, a generating module 12, a transformation matrix storage unit 13, a learning module 14, and an output module 15.

The learning data storage unit 11 is used to store learning data. In the learning data, feature quantities and target values are held in a corresponding manner. Examples of the feature quantities include the temperatures obtained from a sensor. A target value represents the objective value (correct answer data) that is output according to a feature quantity that is input.

The generating module 12 generates a transformation matrix from the learning data in which feature quantities and target values are held in a corresponding manner.

The transformation matrix storage unit 13 is used to store the transformation matrix generated by the generating module 12.

The learning module 14 learns about the parameters of a neural network that includes nodes equal in number to the number of rows of the transformation matrix; that includes a first output layer representing a first estimation distribution according to the values of the nodes; and that includes a second output layer representing a second estimation distribution decided according to the product of the transformation matrix and the first estimation distribution. Examples of the neural network to be learnt include a regression analysis model used in regression analysis and a classification model used in class separation.

More particularly, the learning module 14 includes a first estimation distribution calculating module 141, a second estimation distribution calculating module 142, and an updating module 143. The first estimation distribution calculating module 141 calculates the first output layer representing the first estimation distribution. The second estimation distribution calculating module 142 calculates the second output layer representing the second estimation distribution. The updating module 143 updates the parameters that decide the values of the first output layer (i.e., the first estimation distribution) and decide the values of the second output layer (i.e., the second estimation distribution).

The output module 15 outputs the neural network that has been learnt by the learning module 14.

Example of Neural Network

Figure 2:
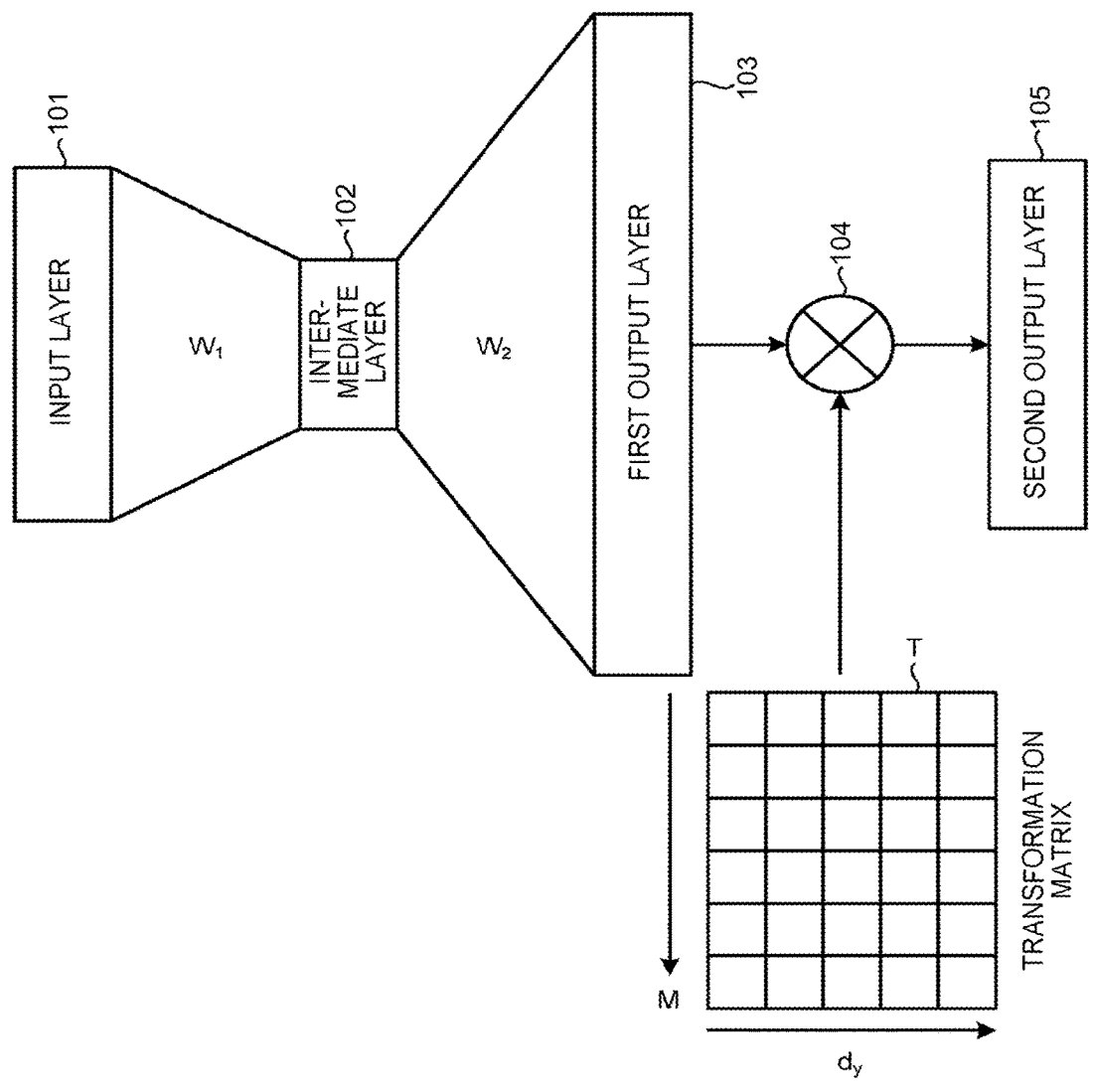
FIG. 2 is a diagram illustrating an example of a neural network according to the embodiment.

FIG. 2 is a diagram illustrating an example of the neural network according to the embodiment. The neural network according to the embodiment includes an input layer 101, an intermediate layer 102, a first output layer 103, a multiplication unit 104, and a second output layer 105. Moreover, $W_1$ represents the weight of the neural network between the input layer 101 and the intermediate layer 102. Similarly, $W_2$ represents the weight of the neural network between the intermediate layer 102 and the first output layer 103.

To the input layer 101, input data is input. Examples of the input data include the feature quantities included in the learning data.

The intermediate layer 102 is a layer (a hidden layer) present in between the input layer 101 and the first output layer 103. In the example illustrated in FIG. 2, although the explanation is given about the case in which there is a single intermediate layer 102, there can be two or more intermediate layers 102.

The first output layer 103 includes nodes equal in number to a count M of the rows in a transformation matrix T, and indicates the first estimation distribution according to the values of the nodes. The first output layer 103 is implemented using the Softmax layer. That is, the sum total of the values of the nodes included in the first output layer 103 is equal to "1".

The multiplication unit 104 calculates the product of the transformation matrix T and the first estimation distribution.

The second output layer 105 indicates the second estimation distribution that is decided according to the product of the transformation matrix T and the first estimation distribution.

Given below is the specific explanation of the operations performed in the learning device 10 according to the embodiment in the case in which a neural network is used in regression analysis.

The learning data storage unit 11 is used to store learning data in which feature quantities $x_i$ (i=1, 2, ..., N), which represent the features of the data, and target values $y_i$, which represent the values that should be subjected to regression, are held in a corresponding manner. Herein, $x_i$ and $y_i$ correspond to the i-th set of data. Moreover, the feature quantities $x_i$ are assumed to be $d_x$-dimensional in nature, and the target values $y_i$ are assumed to be $d_y$-dimensional in nature.

Figure 3:
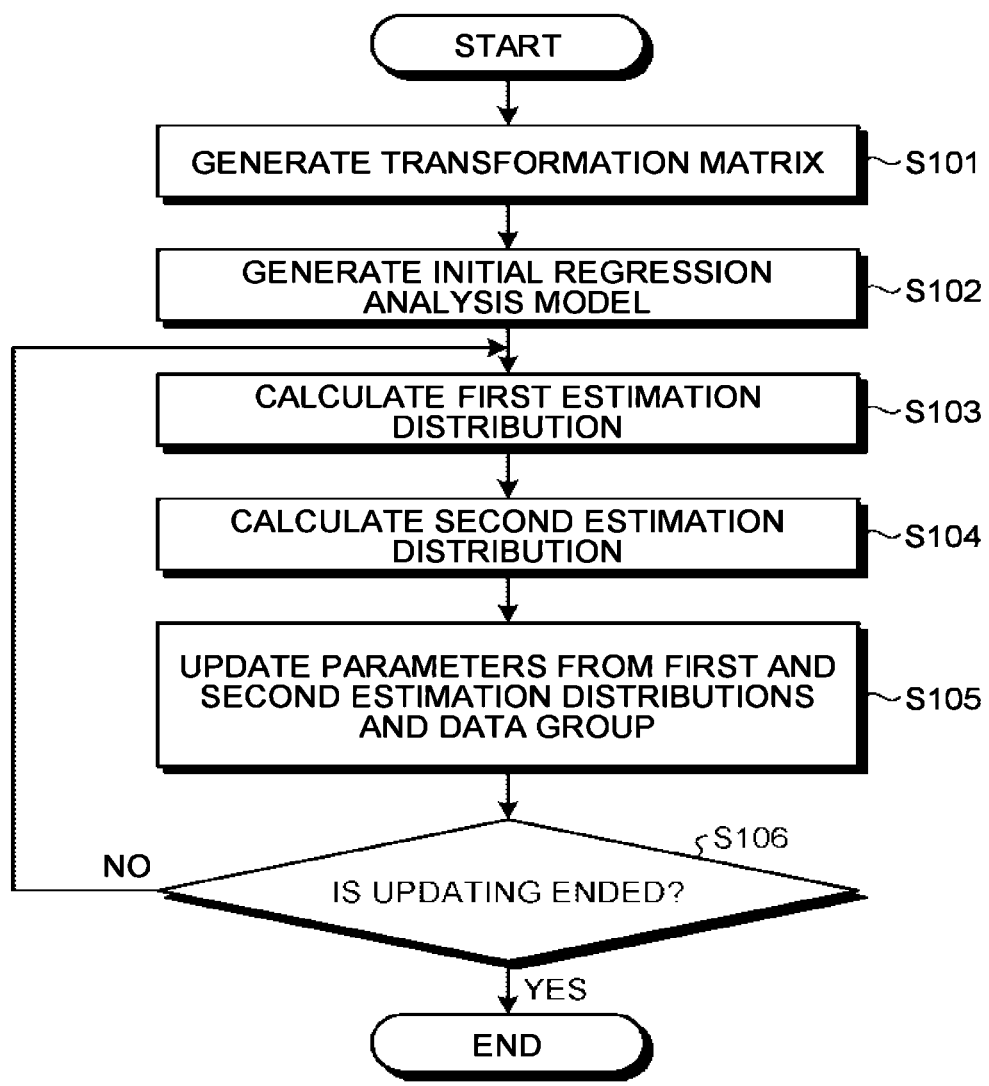
FIG. 3 is a flowchart for explaining an example of a learning method according to the embodiment.

FIG. 3 is a flowchart for explaining an example of the learning method according to the embodiment. Firstly, the generating module 12 selects selection data from the learning data, and generates the transformation matrix T using a matrix including the row vectors based on the selection data (Step S101). More particularly, from the target values $y_i$ (i=1, 2, ..., N), the generating module 12 generates the transformation matrix T having M number of rows and $d_y$ number of columns (M×$d_y$). Herein, M represents the number of pieces of selection data and is equal to or smaller than a count N of the feature quantities $x_i$. In the regression analysis according to the embodiment, either all target values $y_i$ (M=N) or some of the target values $y_i$ (M<N) constitute the rows (row vectors) of the transformation matrix T. In the case of generating the transformation matrix T using some of the target values $y_i$ (i=1, 2, ..., N); for example, the generating module 12 randomly selects the target values $y_i$ (i=1, 2, ..., M).

Then, the updating module 143 generates an initial regression analysis model (a neural network) meant for performing regression of the input data input to the input layer 101 (Step S102). The first output layer 103 has M number of nodes equal to the number of rows of the transformation matrix T. In the initial regression analysis model, the parameters thereof (i.e., the weights $W_1$ and $W_2$ with respect to each node) are initialized in a random manner.

Subsequently, with respect to the input data input to the input layer 101, the first estimation distribution calculating module 141 calculates the first output layer that indicates the first estimation distribution according to values s of the M number of nodes (Step S103). Herein, of each value s in the first estimation distribution, $s_t$ (t=0, 1, ..., M) represents the t-th component. Moreover, the t-th component $s_t$ is decided according to Softmax. That is, the t-th component $s_t$ takes a value from "0" to "1" and represents probability because $s_0+s_1+ ... +s_{M-1}=1$ holds true. As a result, the t-th component $s_t$ decides on the probability of use of the corresponding row of the transformation matrix T. That is, the first estimation distribution indicates the weights of the row vectors included in the transformation matrix T.

Then, the second estimation distribution calculating module 142 calculates values $y'_i$ of the second estimation distribution using the product (matrix product) of the first estimation distribution and the transformation matrix T (Step S104). The values $y'_i$ of the second estimation distribution have the same $d_y$-dimensionality as the target values $y_i$. More particularly, when the values s of the first estimation distribution have three columns and when the transformation matrix T has three rows and two columns (M=3 and $d_y$=2), an example of calculation performed by the second estimation distribution calculating module 142 is given below in Equation (1).

$$s \cdot T = [0.1 \ 0.1 \ 0.8] \begin{bmatrix} 1 & 1 \\ 1 & 2 \\ 2 & 2 \end{bmatrix} = [1.8 \ 1.9] \quad (1)$$

The values calculated in Equation (1) given above represent the second estimation distribution.

Subsequently, from the first and second estimation distributions and the learning data, the updating module 143 updates the parameters of the neural network (i.e., the regression analysis model according to the embodiment) (Step S105). More particularly, the parameters are updated in the units of mini batches. Moreover, as an example of the loss criterion for the updating of the parameters of the regression analysis model, the least mean square error (given below in Equation (2)) is used.

$$L_1 = \sum_j^{d_y} (y'_{ij} - y_{ij})^2 \quad (2)$$

The loss criterion according to the least mean square error represents the proximity between the target values $y_i$ and the second estimation distribution $y'_i$. In Equation (2) given above, j represents the j-th component. The updating module 143 calculates the least mean square error using Equation (2) given above, and further takes the average of the least mean square error by the mini batch count. Using such loss criterion, the second estimation distribution $y'_i$ can be approximated to the target values $y_i$. The updating module 143 updates the parameters of the neural network using, for example, the stochastic gradient descent. As a result, the parameters of the neural network are learnt in such a way that, for example, the first estimation distribution (the weights of the row vectors included in the transformation matrix T) are decided to have more appropriate values.

Then, the updating module 143 determines whether or not the updating of the parameters has ended (Step S106). The determination about the end of the updating is performed based on, for example, the learning count and the state of improvement in the loss criterion. If the updating of the parameters has not yet ended (No at Step S106), then the system control returns to Step S103. When the updating of the parameters ends (Yes at Step S106), then it marks the end of the operations.

In the present embodiment, the following explanation is given about automatic adjustment of the count k of the pieces of learning data and the weights thereof, unlike in the k-nearest neighbors algorithm. As explained earlier, the second estimation distribution is decided according to the matrix product of the values s of the first estimation distribution and the transformation matrix T. In other words, the t-th row of the transformation matrix is multiplied in the column direction by the t-th components $s_t$ of the values s of the first estimation distribution, and the multiplication results are summed up in the row direction. Since the transformation matrix T is generated from the learning data, taking the matrix product of the values s of the first estimation distribution and the transformation matrix T is synonymous with deciding the weights for summing up the pieces of learning data. Thus, the count k of the pieces of learning data and the weights thereof can be automatically adjusted using the values s of the first estimation distribution.

The following explanation is given about a method implemented in the case of further taking into account the degree of similarity of input data. At Step S101 explained earlier, when the transformation matrix T is generated, assume that $x'_i$ represents the feature quantities associated to the target values $y_i$ of the learning data used in the generation. With respect to the transformation matrix T generated by the generating module 12, the updating module 143 issues M number of one-hot vectors h each indicating a row of the transformation matrix T. For example, the one-hot vector indicating the second row of the transformation matrix T is expressed as $h_2 = [0, 1, 0, 0, \ldots, 0]$, and there are M number of elements in the one-hot vector $h_2$.

At Step S105, at the time of updating the parameters of the regression analysis model from the learning data, the updating module 143 adds the feature quantities $x'_i$ to the learning data; and, when the feature quantities $x'_i$ are input, applies the loss criterion of cross entropy (given below in Equation (3)) in addition to applying the loss criterion given earlier in Equation (2).

$$L_2 = -\sum_l^M h_{kl} \log s_{kl} \qquad (3)$$

The updating module 143 calculates the loss criterion of cross entropy using Equation (3) given above, and takes the average within mini batches. In Equation (3), k represents the k-th one-hot vector h from among the M number of one-hot vectors h that are issued, and l represents the l-th component of the k-th one-hot vector h. As a result of applying the loss criterion given above in Equation (3), the parameters are learnt in such a way that, when the feature quantities $x'_i$ that are associated to the target values $y_i$ used in the generation of the transformation matrix T are input to the input layer 101, mainly the rows corresponding to the target values $y_i$ in the transformation matrix T are used.

The updating module 143 updates the parameters in such a way that a loss criterion L, which is given below in Equation (4) and which is obtained by combining Equation (1) and Equation (3) given earlier, becomes smaller.

$$L = L_1 + \lambda L_2 \qquad (4)$$

In Equation (4), $\lambda$ represents an arbitrary parameter representing the weight of the loss criteria $L_1$ and $L_2$. As a result of the second term in Equation (4), the parameters are updated in such a way that, when the feature quantities $x_i$ corresponding to (or similar to) the values of the row vectors included in the transformation matrix T are input, the values of those row vectors in the transformation matrix T are predominantly used.

Given bellow is the explanation of an inference device according to the embodiment.

Exemplary Functional Configuration of Inference Device

Figure 4:
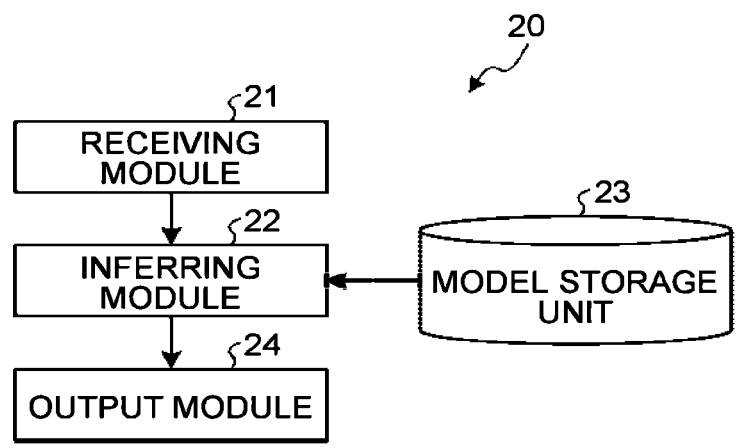
FIG. 4 is a diagram illustrating an exemplary functional configuration of an inference device according to the embodiment.

FIG. 4 is a diagram illustrating an exemplary functional configuration of an inference device 20 according to the embodiment. The inference device 20 according to the embodiment includes a receiving module 21, an inferring module 22, a model storage unit 23, and an output module 24.

The receiving module 21 receives input data to be used in an inference operation.

The inferring module 22 performs the inference operation by inputting the input data to a neural network that includes nodes equal in number to the number of rows of the transformation matrix T generated from the learning data; that includes the first output layer 103 indicating the first estimation distribution according to the values of the nodes; and that includes the second output layer 105 indicating the second estimation distribution decided according to the product of the transformation matrix T and the first estimation distribution. More particularly, the inferring module 22 reads, from the model storage unit 23, the neural network (in the example according to the embodiment, the regression analysis model) that has been learnt by the learning device 10. Then, the inferring module 22 inputs the input data to the input layer 101 of the neural network that has been read from the model storage unit 23. Subsequently, the inferring module 22 inputs, to the output module 24, the data output from the second output layer 105 of the neural network.

The output module 24 outputs, as the inference result, the data input from the inferring module 22.

Meanwhile, the inference device 20 can either be implemented in the same device as the learning device 10 or be implemented in a different device than the learning device 10.

Figure 5:
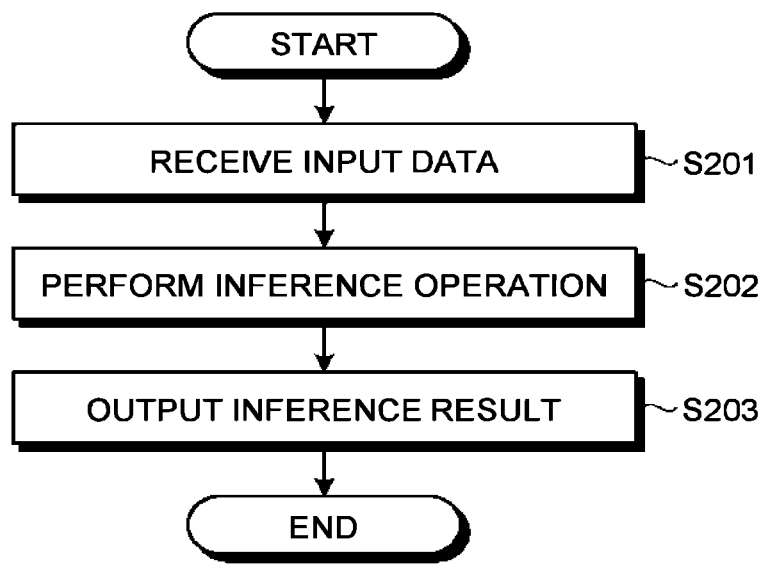
FIG. 5 is a flowchart for explaining an example of an inference method according to the embodiment.

FIG. 5 is a flowchart for explaining an example of the inference method according to the embodiment. Firstly, the receiving module 21 receives the input data to be used in the inference operation (Step S201). Then, the inferring module 22 performs the inference operation explained above (Step S202). Subsequently, the output module 24 outputs, as the inference result, the output data obtained as a result of performing the inference operation at Step S202 (Step S203).

Given below is the explanation of a specific example of regression analysis.

FIG. 6 is a diagram illustrating an example of the learning data (in the case of performing regression analysis) according to the embodiment. In the example illustrated in FIG. 6, temperatures $T_1$, $T_2$, and $T_3$ represent feature quantities $x_1$ to $x_3$, respectively. Moreover, pressures $P_1$ and $P_2$ that are predicted from the temperatures $T_1$, $T_2$, and $T_3$ represent target values $y_1$ and $y_2$, respectively.

Firstly, the generating module 12 generates the transformation matrix T based on the pressures $P_1$ and $P_2$. If it is assumed that the learning data corresponding to serial numbers 1, 2, and N is used in generating the transformation matrix T, then the transformation matrix T is expressed as given below in Equation (5).

$$T = \begin{bmatrix} 10 & 10 \\ 5 & 10 \\ 10 & 0 \end{bmatrix} \quad (5)$$

Then, using the stochastic gradient descent, the updating module 143 updates the parameters (the weights $W_1$ and $W_2$) of the neural network in such a way that the loss criterion $L_1$ given earlier in Equation (2) becomes smaller.

The inference device 20 performs regression analysis with respect to new data using the transformation matrix T and using the weights $W_1$ and $W_2$ obtained as a result of the learning. For example, assume that new data X=[100, 100, 80] is input to the inference device 20, and assume that the values of the first estimation distribution are s=[0.8, 0.10.1]. In that case, the inference device 20 outputs $y'_i$=[9.5, 9] of the second estimation distribution according to the product of s=[0.8, 0.10.1] and the transformation matrix T.

Given below is the explanation of the case in which the weights $W_1$ and $W_2$ are updated in such a way that the loss criterion L given earlier in Equation (4) becomes smaller. The feature quantity $x'_i$ that correspond to the learning data $y_i$ used in generating the transformation matrix T is expressed as given below in Equation (6).

$$x'_i = \begin{bmatrix} 100 & 100 & 100 \\ 200 & 100 & 100 \\ 0 & 100 & 0 \end{bmatrix} \quad (6)$$

In Equation (6), each row indicates the feature quantity corresponding to a set of learning data $y_i$ used in generating the transformation matrix T. For example, the first row of the feature quantity $x'_1$ corresponds to the feature quantity $x_i$ of the learning data having the serial number 1.

The updating module 143 updates the parameters (the weights $W_1$ and $W_2$) of the neural network from the feature quantities $x'_i$ and the target values $y_i$ in such a way that the loss criterion L given earlier in Equation (4) becomes smaller. Under the premise that the learning has been ideal; for example, when the same value as the first row of the feature quantities $x'_i$ (i.e., equivalent to the learning data having the serial number 1) is input, the value of the first estimation distribution becomes equal to s=[1, 0, 0]. When the product of s=[1, 0, 0] and the transformation matrix T is taken, the second estimation distribution becomes equal to [10, 10], and the neural network is expected to be able to reproduce the learning data with more accuracy.

To summarize the explanation given above, when a neural network is to be used in regression analysis, the generating module 12 selects n pieces of selection data (in the example given above, n=3) from the learning data, and generates the transformation matrix T based on a matrix that includes n number of row vectors representing the target values corresponding to the pieces of selected data. As a result of using the loss criterion given earlier in Equation (4); when the feature quantities corresponding to the target values represented by the row vectors are input to the neural network, the learning module 14 learns the parameters in such a way that the row vectors representing the target values are predominantly used.

As explained above, in the learning device 10 according to the embodiment, the generating module 12 generates the transformation matrix T from the learning data in which the feature quantities $x_i$ and the target values $y_i$ are held in a corresponding manner. Then, the learning module 14 learns about the parameters of the neural network that includes nodes equal in number to the number of rows of the transformation matrix T; that includes the first output layer 103 indicating the first estimation distribution according to the values of the nodes; and that includes the second output layer 105 indicating the second estimation distribution decided according to the product of the transformation matrix T and the first estimation distribution.

As a result, in the learning device 10 according to the embodiment, unlike in the case of the k-nearest neighbors algorithm, the count k of the pieces of data to be selected and the weight of the k selected pieces of the data need not be decided in a heuristic manner; and can be decided according to the input data. That is, it becomes possible to learn about a neural network in which the weight at which each set of learning data is to be summed up is appropriately controlled according to the input data.

Moreover, in the inference device 20 according to the embodiment, the receiving module 21 receives the input data. The inferring module 22 performs the inference operation by inputting the input data to the neural network that includes nodes equal in number to the number of rows of the transformation matrix T generated from the learning data; that includes the first output layer 103 indicating the first estimation distribution according to the values of the nodes; and that includes the second output layer 105 indicating the second estimation distribution decided according to the product of the transformation matrix T and the first estimation distribution. Then, the output module 24 outputs the output of the second output layer 105 as the inference result.

As a result, in the inference device 20 according to the embodiment, unlike in the case of the k-nearest neighbors algorithm, an appropriate inference result can be obtained even if the count k of the pieces of data to be selected and the weight of the k selected pieces of the data are not decided in heuristic manner.

Modification Example of Embodiment

Given below is the explanation a modification example of the embodiment. In the modification example, the identical explanation to the explanation of the embodiment is not repeated, and only the differences with the embodiment are explained. In the embodiment described above, the explanation is given about the case in which a neural network is used in regression analysis. Alternatively, in the modification example, the explanation is given about a case in which a neural network is used in class separation.

FIG. 7 is a diagram illustrating an example of the learning data (in the case of performing class separation) according to a modification example of the embodiment. In the example illustrated in FIG. 7, the temperatures $T_1$, $T_2$, and $T_3$ represent the feature quantities $x_1$ to $x_3$, respectively. Moreover, the target values y represent classes (in the example illustrated in FIG. 7, "0" and "1").

Firstly, the generating module 12 generates the transformation matrix T from the classes. If it is assumed that the learning data corresponding to the serial numbers 1, 2, and N is used in generating the transformation matrix T, then the transformation matrix T is expressed as given below in Equation (7).

$$T = \begin{bmatrix} 1 \\ 0 \\ 0 \end{bmatrix} \quad (7)$$

In an identical manner to the case of regression analysis, the updating module 143 updates the parameters (the weights $W_1$ and $W_2$) of the neural network.

If an output y' of the second estimation distribution is smaller than 0.5, then the inference device 20 classifies the output y' in the class "0". On the other hand, if an output y' of the second estimation distribution is equal to or greater than 0.5, then the inference device 20 classifies the output y' in the class "1". For example, assume that new data X=[100, 100, 80] is input, and the values of the first estimation distribution are s=[0.8, 0.10.1]. In that case, from the product of s=[0.8, 0.10.1] and the transformation matrix T, the output y of the second estimation distribution becomes equal to 0.8. Hence, the new data X=[100, 100, 80] gets classified in the class "1".

To summarize the explanation given above, when a neural network is to be used in class separation, the generating module 12 selects n pieces of selection data (in the example given above, n=3 holds true) from the learning data, and generates the transformation matrix T based on an n×1 matrix representing the classes of the pieces of selected data. As a result of using the loss criterion given earlier in Equation (4), when the feature quantities corresponding to the classes indicated in the n×1 matrix are input to the neural network, the learning module 14 learns the parameters in such a way that the components of the n×1 matrix indicating the classes are predominantly used.

Lastly, the explanation is given about an exemplary hardware configuration of the learning device 10 and the inference device 20 according to the embodiment.

Exemplary Hardware Configuration

Figure 8:
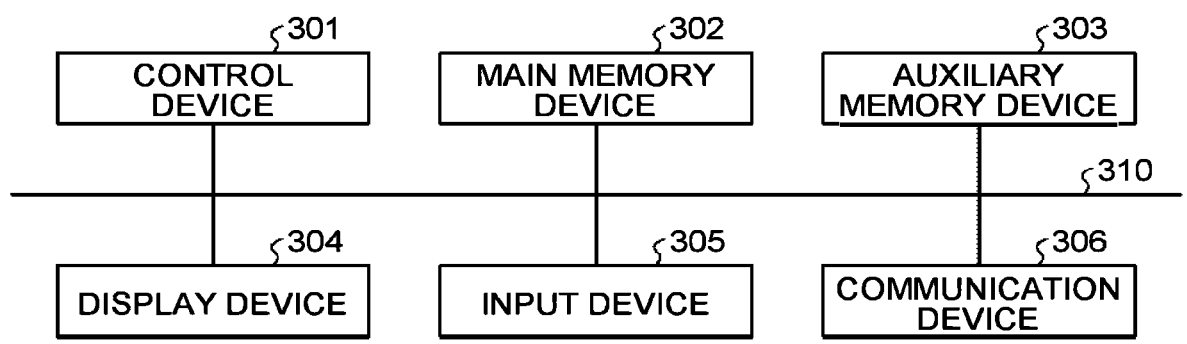
FIG. 8 is a diagram illustrating an exemplary hardware configuration of the learning device and the inference device according to the embodiment.

FIG. 8 is a diagram illustrating an exemplary hardware configuration of the learning device 10 and the inference device 20 according to the embodiment.

The learning device 10 as well as the inference device 20 includes a control device 301, a main memory device 302, an auxiliary memory device 303, a display device 304, an input device 305, and a communication device 306. Herein, the control device 301, the main memory device 302, the auxiliary memory device 303, the display device 304, the input device 305, and the communication device 306 are connected to each other via a bus 310.

The control device 301 executes programs that are read from the auxiliary memory device 303 into the main memory device 302. The main memory device 302 is a memory such as a read only memory (ROM) or a random access memory (RAM). The auxiliary memory device 303 is a hard disk drive (HDD), a solid state drive (SSD), or a memory card.

The display device 304 displays display information. Examples of the display device 304 include a liquid crystal display. The input device 305 is an interface for operating a computer. Examples of the input device 305 include a keyboard and a mouse. If the computer is a smart device such as a smartphone or a tablet terminal, the display device 304 and the input device 305 constitute, for example, a touch-sensitive panel. The communication device 306 is an interface for communicating with other devices.

A program executed in the computer is recorded as an installable file or an executable file in a computer-readable recording medium such as a CD-ROM, a memory card, a CD-R, or a digital versatile disc (DVD); and is provided as a computer program product.

Alternatively, the program executed in the computer can be stored in a downloadable manner in a computer connected to a network such as the Internet. Still alternatively, the program executed in the computer can be distributed via a network such as the Internet without involving downloading.

Still alternatively, the program executed in the computer can be stored in advance in a ROM.

The program executed in the computer has a modular configuration including the functional blocks that, from among the functional configuration (functional blocks) of the learning device 10 and the inference device 20, are implementable using the program. As far as the actual hardware is concerned, the control device 301 reads the program from the recording medium and executes it, so that the functional blocks get loaded in the main memory device 302. That is, the functional blocks get generated in the main memory device 302.

Meanwhile, some or all of the functional blocks can be implemented using hardware such as an integrated circuit (IC).

Moreover, in the case of implementing the functions using a plurality of processors, each processor can be used to implement a single function or to implement two or more functions.

Furthermore, the computer serving as the learning device 10 (or the inference device 20) can have an arbitrary operation mode. For example, the learning device 10 (or the inference device 20) can be implemented using a single computer. Alternatively, for example, the learning device 10 (or the inference device 20) can be operated as a cloud system in a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning device comprising:
a memory; and
one or more processors coupled to the memory and configured to:
generate a transformation matrix from learning data in which feature quantities and target values are held in a corresponding manner; and
learn about parameters of a neural network which includes:
nodes equal in number to number of rows of the transformation matrix;
a first output layer representing a first estimation distribution according to values of the nodes; and
a second output layer representing a second estimation distribution decided according to a product of the transformation matrix and the first estimation distribution.

2. The device according to claim 1, wherein the one or more processors are configured to:
select selection data from the learning data; and
generate the transformation matrix according to a matrix that includes a row vector based on the selection data.

3. The device according to claim 2, wherein the first estimation distribution represents a weight of the row vector, and the one or more processors are configured to learn about the parameters of the neural network in such a way that the weight of the row vector is decided to have a more appropriate value.

4. The device according to claim 2, wherein
the neural network is used in regression analysis, and
the one or more processors are configured to:
   select n pieces of selection data from the learning data; and
   generate the transformation matrix according to a matrix that includes n row vectors representing target values associated to the pieces of selection data.

5. The device according to claim 4, wherein, when feature quantities corresponding to the target values represented by the row vectors are input to the neural network, the one or more processors are configured to learn about the parameters in such a way that the row vectors representing the target values are predominantly used.

6. The device according to claim 2, wherein
the neural network is used in class separation, and
the one or more processors are configured to:
   select n pieces of selection data from the learning data; and
   generate the transformation matrix according to an n×1 matrix representing classes of the pieces of selected data.

7. The device according to claim 6, wherein, when feature quantities corresponding to the classes represented by the n×1 matrix are input to the neural network, the one or more processors are configured to learn about the parameters in such a way that components of the n×1 matrix representing the classes are predominantly used.

8. An inference device comprising:
a memory; and
one or more processors coupled to the memory and configured to:
receive input data;
perform an inference operation by inputting the input data to a neural network which includes:
   nodes equal in number to number of rows of a transformation matrix generated from learning data;
   a first output layer representing a first estimation distribution according to values of the nodes; and
   a second output layer representing a second estimation distribution decided according to a product of the transformation matrix and the first estimation distribution;
and output, as inference result, output of the second output layer.

9. A learning method comprising:
generating, by a learning device, a transformation matrix from learning data in which feature quantities and target values are held in a corresponding manner; and
learning, by the learning device, about parameters of a neural network which includes:
   nodes equal in number to number of rows of the transformation matrix;
   a first output layer representing a first estimation distribution according to values of the nodes; and
   a second output layer representing a second estimation distribution decided according to a product of the transformation matrix and the first estimation distribution.

* * * * *